(12) United States Patent  
Popenoe

(10) Patent No.: US 7,958,614 B2
(45) Date of Patent: Jun. 14, 2011

(54) METHOD OF MAKING A FASTENING DEVICE FOR VISUALLY INDICATING TENSION

(76) Inventor: Charles H. Popenoe, Bethesda, MD (US)

( * ) Notice: Subject to any disclaimer, the term of this patent is extended or adjusted under 35 U.S.C. 154(b) by 527 days.

(21) Appl. No.: 11/869,266

(22) Filed: Oct. 9, 2007

(65) Prior Publication Data

US 2009/0092457 A1    Apr. 9, 2009

(51) Int. Cl.
  *B21D 39/00* (2006.01)
  *B23P 17/00* (2006.01)
  *F16B 31/02* (2006.01)
(52) U.S. Cl. .............. 29/446; 29/452; 411/13; 411/14
(58) Field of Classification Search ............ 29/446, 29/452, 525.11, 525.13; 411/13, 14; 156/165, 156/275.5, 275.7, 293
See application file for complete search history.

(56) References Cited

U.S. PATENT DOCUMENTS

| 3,602,186 A | 8/1971 | Popenoe |
| 3,799,108 A | 3/1974 | Mosow |
| 3,823,639 A | 7/1974 | Liber |
| 3,850,133 A | 11/1974 | Johnson |
| 3,864,024 A | 2/1975 | Olson |
| 3,964,299 A | 6/1976 | Johnson |
| 3,987,668 A | 10/1976 | Popenoe |
| 3,987,699 A | 10/1976 | Popenoe |
| 4,002,139 A | 1/1977 | Payne |
| 4,082,635 A * | 4/1978 | Fritz et al. ................ 522/33 |
| 4,091,763 A | 5/1978 | Snider |
| 4,100,666 A | 7/1978 | Payne |
| 4,114,428 A | 9/1978 | Popenoe |
| RE30,183 E | 1/1980 | Popenoe |
| 4,676,109 A | 6/1987 | Wallace |
| 4,771,999 A | 9/1988 | Takeuchi |
| 4,793,751 A | 12/1988 | Takeuchi |
| 4,898,370 A | 2/1990 | Saito et al. |
| 4,904,132 A | 2/1990 | Popenoe |
| 5,088,867 A | 2/1992 | Mun |
| 5,189,979 A | 3/1993 | Popenoe |
| 6,282,950 B1 | 9/2001 | Taylor, Jr. et al. |
| 6,664,357 B1 * | 12/2003 | Edelman ................ 526/329.6 |
| 2006/0048467 A1 | 3/2006 | Martineau et al. |

FOREIGN PATENT DOCUMENTS

| DE | 3841567 | 6/1989 |
| GB | 2 195 459 | 8/1987 |
| GB | 2 229 003 | 9/1990 |
| JP | 60-242792 | 12/1985 |
| JP | 6-20992 | 6/1994 |

OTHER PUBLICATIONS

"Seeing is Believing with Innovative Visual Tension Indicator", Douglas Glenn Clark, InfraStructures, Aug. 2007, pp. 1-3.
SmartBolts, Direct Tension Indicating Fasteners, Stress Indicators, Inc., 2007, pp. 1-2.

* cited by examiner

*Primary Examiner* — Jermie E Cozart
(74) *Attorney, Agent, or Firm* — Roylance, Abrams, Berdo & Goodman, L.L.P.

(57) ABSTRACT

The present invention relates to fasteners and more specifically to a fastener adapted to visually indicate tension, and method of making thereof.

6 Claims, 2 Drawing Sheets

METHOD OF MAKING A FASTENING DEVICE FOR VISUALLY INDICATING TENSION

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates to fasteners and more specifically to a fastener adapted to visually indicate tension, and method of making thereof.

BACKGROUND OF THE INVENTION

Opti-mechanical devices for displaying small displacements or movements based on a change in color to indicate tension are described in U.S. Pat. No. 3,987,699 (Popenoe), U.S. Pat. No. 4,904,132 (Popenoe), and U.S. Pat. No. 5,189,979 (Popenoe). Regardless of the benefits provided by these devices such devices have hitherto been difficult and time consuming to manufacture. Thus, there is a need for faster ways of manufacturing fasteners fitted with tension displacement indicators.

SUMMARY OF THE INVENTION

The present invention relates to fasteners and more specifically to a fastener adapted to visually indicate tension, and method of making thereof.

BRIEF DESCRIPTION OF THE DRAWINGS

Similar reference characters denote corresponding features consistently throughout the attached drawings.

DETAILED DESCRIPTION OF THE INVENTION

Figure 1:
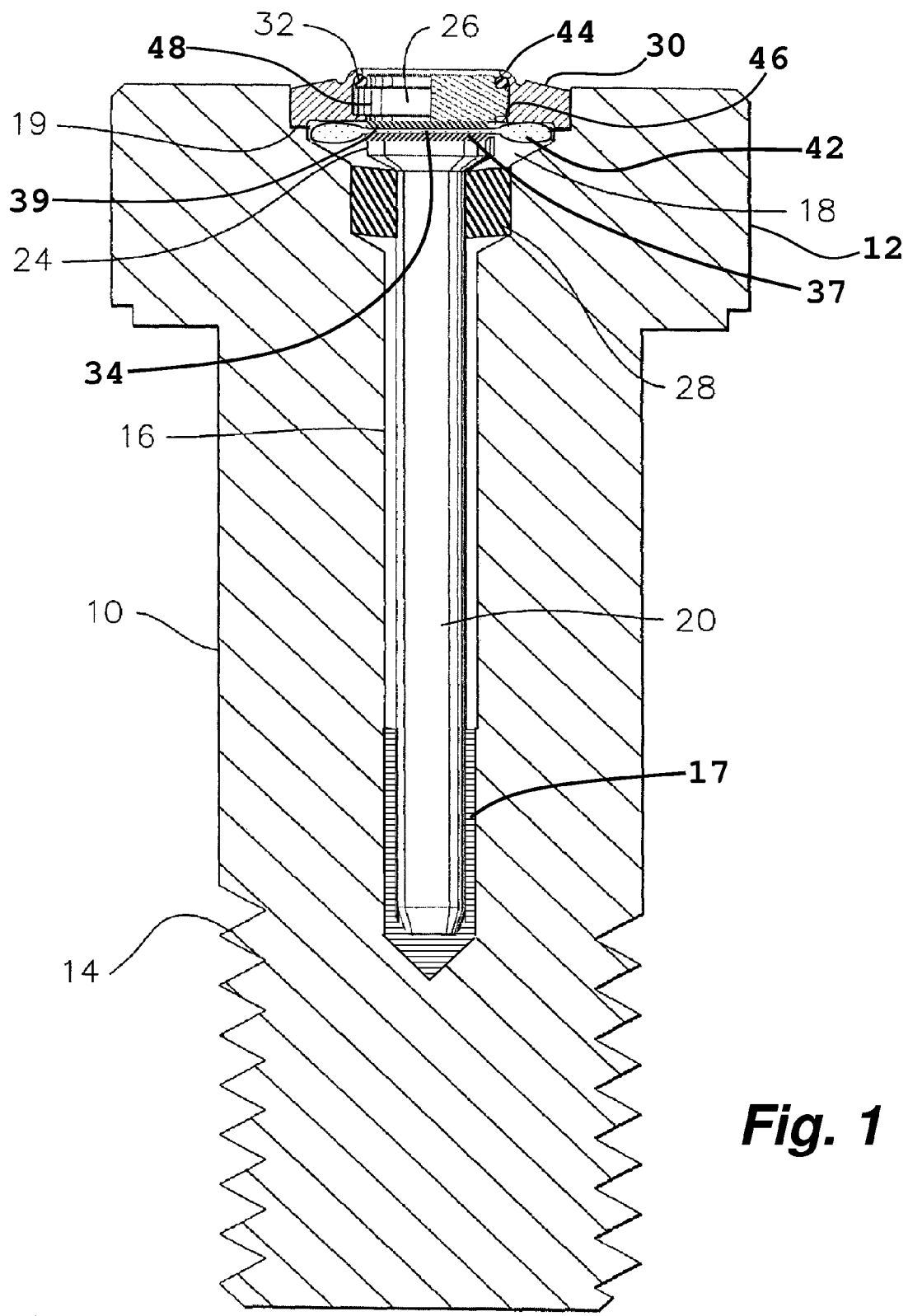
FIG. 1 is a schematic cross section view of a bolt fitted with a tension displacement indicator according to the present invention.

The present invention is directed to fasteners and more specifically to a fastener adapted to visually indicate tension, and method of making thereof.

Reference numeral 10 is used generally to denote a fastener in the form of a bolt containing a tension indicator in accordance with the present invention. However, it should be understood that the fastener could take other forms; for example, the fastener can be a stud containing a tension indicator in accordance with the present invention.

Figure 2:
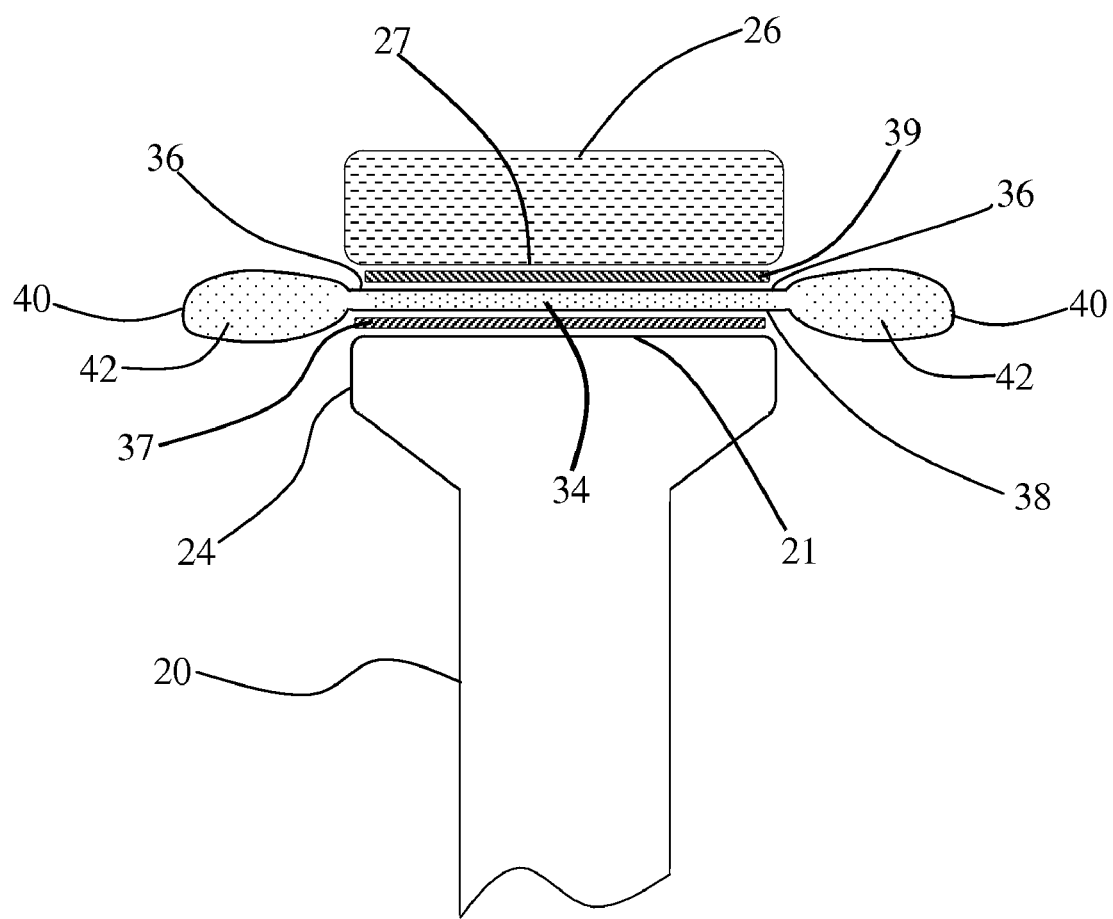
FIG. 2 is a partial schematic cross section view of a bolt fitted with a tension displacement indicator according to the present invention.

Referring to the schematic cross-section views shown in FIGS. 1 and 2, bolt 10 has a head 12 usually in the form of a square or hexagon so that it may be turned with a wrench, and a lower threaded end 14 for insertion in the threaded hole of a member to be fastened, or alternatively for use with a nut to fasten two mechanical members together in conventional fashion. An axial bore 16 extends from head 12 to a point near the threaded end of bolt 10 and is countersunk to provide a large bore or recess 18. Recess 18 includes a stop 19 around its outer periphery.

Still referring to FIGS. 1 and 2, an actuating pin or rod 20 is inserted into the bore 16 a small amount of adhesive 17, such as an anaerobic adhesive, fixes the bottom end of actuating pin 20 permanently in place in axial bore 16 after calibration. In this way actuating pin 20 can be set at any position in the axial bore 16 and will remain at the position until the adhesive hardens. The top end of actuating pin 20 terminates in a head 24 having a colored indicator portion on top surface 21. The colored top surface 21 faces the bottom surface 27 of movable indicator window 26. The colored indicator portion can take the form of a colored disc (not shown) located on the top surface 21 of head 24. The colored indicator portion faces the bottom surface 27 of movable indicator window 26.

Resilient washer 28 serves to center actuating pin 20 at its head end, to bias actuating pin 20 upward towards window 26, and to damp any vibrations during use; the washer 28 can be any suitable washer such as, but not limited to, a silicone washer. Maximum upward movement of indicator window 26 is limited by window mount ring 30 while a resilient O-ring 32 is placed at the top of window mount ring 30 to bias indicator window 26 downward. A flexible indicator area 34 separates head 24 and indicator window 26 from each other. It should be understood that the O-ring 32 could be replaced with a wave spring.

Flexible indicator area 34 is fixed to the top surface 21 of head 24. The thickness of the indicator area 34 in all of the drawings is greatly exaggerated for clarity. In actual practice, the thickness of indicator area 34 would be less than one thousandth of an inch. Indicator area 34 is comprised of an upper layer 36 of clear flexible plastic that is sealed to a lower layer 38 of clear flexible plastic at the periphery 40 so as to fully enclose a mass of a light-absorbing indicating fluid 42, such as dark light-absorbing indicator fluid. The flexibility of the plastic layers 36 and 38 permits the area 34 to bulge out around the periphery of actuating pinhead 24 in order to compensate for the compression of the fluid containing means above actuating pinhead 24. Consequently, when the bottom surface 27 of moveable window 26 is very close to the actuating pinhead 24 very little or no light-absorbing indicating fluid 42 is found between head 24 and window 26 so that light may be freely transmitted from head 24 to window 26.

Head 24 is attached by a first layer 37 of light curable adhesive to lower layer 38. A colored area in lower layer 38 could replace the colored area on surface 21 of head 24.

Window 26 is affixed to upper layer 36. More specifically, a second layer 39 of light curable adhesive fixes the lower surface 27 of window 26 to upper layer 36. The movable window 26 is made of glass, plastic or other suitable transparent or translucent material through which visible light or ultraviolet light can be transmitted.

The light curable adhesive used in first and second layers 37 and 39 can be any suitable light curable adhesive such as, but not limited to, light curable silicone based adhesive that can cure upon exposure to visible light or ultraviolet light. For example, white light can be used to cure light curable adhesive; alternatively, blue light such as intense blue light can be used to cure light curable adhesive. Intense white light will work to cure light curable adhesive such as light curable silicone.

The first and second layers 37 and 39 should be transparent to light both prior to and after curing. Light should be transmissible from the colored area on surface 21 and onward through window 26. The color or brightness of the transmitted light is modified according to the thickness (and hence amount of fluid 42) between head 24 and window 26. The thickness of flexible indicator area 34 varies according to the stress applied to the fastener 10.

High accuracy visual tension indicating fasteners require that the fastener be assembled and calibrated while under a prescribed tensile stress at the desired design tension. Prior to the instant invention, the adhesives used have not been of light curing composition. This required that the fastener be carefully assembled under tension and then must remain in a tensioning device at the prescribed tension until the adhesives cured, taking more than one hour. Often they were cured overnight before the tension could be reduced to zero and the fastener removed. Volume production was impractical with such extended curing periods.

The inventor has made the unexpected discovery that light (such as intense white light, or intense blue or ultraviolet light) transmitted through window 26 in combination with first and second layers 37 and 39 composed of light curable adhesive significantly improved the rate of production. For example, the inventor has found that he could manufacture fasteners fitted with tension displacement indicators about 20 times faster using visible or UV light to cure first and second curable adhesive layers 37 and 39 in place of layers using conventional non-light curable adhesive. This unexpected discovery has vastly improved manufacturing output.

Mount ring 30 is constructed to include a cavity bordered by an upper shoulder 44 and a lower shoulder 46. Indicator window 26 is located between the upper and lower shoulders and is held there by means of a rim 48 extending around the window's midsection having a height a which is less than the distance between the upper shoulder 44 and the lower shoulder 46, allowing an amount of movement of the window somewhat greater than the retraction of the pin at design tension. Since the width of rim 48 is slightly less than the distance between the most widely separated walls of the cavity in mounting ring 30, indicator window 26 is free to move within the mount ring 30 between upper shoulder 44 and lower shoulder 46. Resilient O-ring 32 is located directly on top of window 26 in mount ring 30.

It should also be emphasized that this invention can exploit changes in intensity not only in visible light, but also in infrared, ultra-violet, beta radiation or any wavelength of electromagnetic radiation that is desired and according to the absorbing fluid 42.

The curing rate of light curable layers 37 and 39 can be varied by the intensity of the blue, violet or ultraviolet light incident on each layer 37 and 39. Therefore, the use of the term "light" in this specification and claims, is not limited to visible radiation, but may refer to radiation in any usable part of the electromagnetic spectrum.

In one aspect of the present invention, a method of making a fastening device adapted to visually indicate tension in the fastening device through changes in color or brightness comprising the steps of: providing a fastening device; fitting an actuating means to the fastening device for responding in a predetermined manner to a displacement between first and second points in the fastening device, wherein the actuating means comprises a top surface; attaching a colored indicator portion to the top surface of the actuating means; providing an indicator window, the indicator window being transparent to light capable of curing light curable adhesive, the indicator window having top and bottom surfaces; providing a window mount means attached to the fastening device in axial relationship with the actuating means for holding and limiting the movement of the indicator window between an upper shoulder and a lower shoulder; providing a biasing means for resiliently biasing the colored indicator portion and the indicator window towards each other; providing a means for absorbing an initial portion of the relative displacement between the first and second points until a preselected displacement has occurred, and using subsequent displacement to vary the distance between the indicator window and the colored indicator portion; providing a flexible indicator means positioned between the indicator window and the colored indicator portion for altering the amount of light transmitted to the indicator window from the colored indicator portion, whereby the observed color change of the indicator will be concentrated in a selected portion of the total displacement change between the first and second points, the flexible indicator means defines a top surface and a bottom surface; applying a predetermined tensile force to elongate said fastening device; attaching the top portion of the actuating means to the bottom surface of the flexible indicator means by application of a first layer of light curable adhesive between the top surface of the actuating means and the bottom surface of the flexible indicator means; attaching the top surface of the flexible indicator means to the bottom surface of the indicator window by application of a second layer of light curable adhesive between the top surface of the flexible indicator means and the lower surface of the indicator window; applying an external force to position said indicator window against said lower shoulder; and transmitting light capable of curing the first and second layers of light curable adhesive through the indicator window to cure the first and second layers of light curable adhesive while the fastening device is elongated under tension.

In another aspect of the present invention, a fastening device is provided for visually indicating tension by responding to extremely small changes in displacement between two points in the fastening device through changes in color or brightness. The fastening devices comprises: actuating means for responding in a predetermined manner to a displacement between the two points in the fastening device, the actuating means comprises a top surface; a colored indicator portion attached to the top surface of the actuating means; an indicator window, the indicator window being transparent to light capable of curing light curable adhesive (such as, but not limited to, light curable silicone, the indicator window having top and bottom surfaces; window mount means attached to the structure in axial relationship with the actuating means for holding and limiting the movement of the indicator window; biasing means for resiliently biasing the colored indicator portion and the indicator window towards each other; means for absorbing an initial portion of the relative displacement between the two points until a preselected displacement has occurred, and transmitting subsequent displacement to vary the distance between the indicator windows and the colored indicator portion; flexible indicator means positioned between the indicator window and the colored indicator portion for altering the amount of light transmitted to the indicator window from the colored indicator portion, whereby the observed color change of the indicator will be concentrated in a selected portion of the total displacement change between the two points, the flexible indicator means defines a top surface and a bottom surface; a first layer of light curable adhesive, the first layer of light curable adhesive being located between the top portion of the actuating means and the bottom surface of the flexible indicator means; and a second layer of light curable adhesive, the second layer of light curable adhesive being located between the top surface of the flexible indicator means and the lower surface of the indicator window, wherein the first and second layers of light curable adhesive are in a cured state.

In one embodiment of the present invention, a fastener 10 is manufactured by providing a fastener such as a bolt with an axial bore 16, recess 18 and stop 19 situated therein. The bolt is inserted into a tensioner such as a Skidmore-Wilhelm hydraulic tensioner. The bolt is finger tightened. The bolt is tensioned to proof load and a predetermined amount of anaerobic adhesive is inserted into the bottom of the axial bore 16. Actuating pin 20 is inserted into bore 16 and pressed down lightly. A first dab of light curable adhesive is placed on actuating pin head 24 to provide first layer 37 of light curable adhesive. A second dab of light curable adhesive is placed on the bottom of the window assembly (which includes window 26, window mount ring 30, and O-ring 32) to provide second layer 39 of light curable adhesive. It will be understood that the first and second dabs of light curable adhesive can be applied in reverse order to provide first and second layers 37 and 39. Microindicator (which includes flexible indicator area 34 and indicating fluid 42) is inserted into the bolt above actuating pin head 24. The window assembly, now comprising mount ring 30, window 26, O-ring 32 and second dab of light curable adhesive, is then inserted into recess 18. The window assembly is clamped down using suitable clamps to seat it intimately against stop 19 and is permanently staked in place as by deforming bolt head 12 around the periphery of mount ring 30. The tension is then reduced to a calculated set point tension near the desired design tension. Window 26 is then pressed down farther by additional external force to seat rim 48 intimately against lower shoulder 46, squeezing out any excess uncured light curable adhesive from the top and bottom surfaces of the microindicator, and pressing actuating pin 20 farther into bore 16, displacing uncured anaerobic adhesive 17. Sufficient light (such as intense visible or UV light) is now directed (i.e. transmitted) through window 26 to cure layers 37 and 39. The cure time will be inversely proportional to the intensity of the directed light. Adhesive layers 37 and 39 will now be sufficiently cured, but the applied tension on the fastener must be maintained for an additional interval, (perhaps 2 or more minutes) to allow the anaerobic adhesive 17 to develop sufficient strength to resist movement of pin 20 when the tension is released. After this interval, the tension may be increased to the design tension to verify proper performance of the finished fastener. Tension may then be reduced to zero and the assembly and calibration of the fastener is complete.

It is to be understood that the present invention is not limited to the embodiments described above, but encompasses any and all embodiments within the scope of the following claims.

I claim:

1. A method of making a fastening device adapted to visually indicate tension in the fastening device through changes in color or brightness comprising the steps of:

fitting an actuating means to a fastening device, wherein said actuating means responds in a predetermined manner to a displacement between first and second points in said fastening device, wherein said actuating means comprises a top surface;

attaching a colored indicator portion to the top surface of said actuating means;

providing an indicator window, said indicator window being transparent to light capable of curing light curable adhesive, said indicator window having top and bottom surfaces;

providing a window mount means attached to the fastening device in axial relationship with said actuating means for holding and limiting the movement of said indicator window between an upper shoulder and a lower shoulder;

providing a biasing means for resiliently biasing said colored indicator portion and said indicator window towards each other;

providing a means for absorbing an initial portion of the relative displacement between said first and second points until a preselected displacement has occurred, and using subsequent displacement to vary the distance between said indicator window and said colored indicator portion;

providing a flexible indicator means positioned between said indicator window and said colored indicator portion for altering the amount of light transmitted to said indicator window from said colored indicator portion, whereby the observed color change of the indicator will be concentrated in a selected portion of the total displacement change between said first and second points, said flexible indicator means defines a top surface and a bottom surface;

applying a predetermined tensile force to elongate said fastening device;

attaching the top portion of said actuating means to the bottom surface of said flexible indicator means by application of a first layer of light curable adhesive between the top surface of said actuating means and the bottom surface of said flexible indicator means;

attaching the top surface of said flexible indicator means to the bottom surface of said indicator window by application of a second layer of light curable adhesive between said top surface of said flexible indicator means and said lower surface of said indicator window;

applying an external force to position said indicator window against said lower shoulder; and transmitting light capable of curing said first and second layers of light curable adhesive through said indicator window to cure said first and second layers of light curable adhesive while said fastening device is elongated under tension.

2. The method for producing fastening devices adapted to visually indicate tension according to claim 1, wherein the fastening device is a bolt.

3. The method for producing fastening devices adapted to visually indicate tension according to claim 1, wherein the fastening device is a stud.

4. The method for producing fastening devices adapted to visually indicate tension according to claim 1, wherein said first and second layers of light curable adhesive comprise of light curable silicone adhesive.

5. The method for producing fastening devices adapted to visually indicate tension according to claim 1, wherein the step of transmitting light capable of curing said first and second layers of light curable adhesive through said indicator window comprises the step of transmitting visible light through said indicator window.

6. The method for producing fastening devices adapted to visually indicate tension according to claim 1, wherein the step of transmitting light capable of curing said first and second layers of light curable adhesive through said indicator window comprises the step of transmitting ultraviolet light through said indicator window.

* * * * *